US009285971B2

(12) United States Patent
Kokemohr

(10) Patent No.: US 9,285,971 B2
(45) Date of Patent: Mar. 15, 2016

(54) COMPARTMENTALIZED IMAGE EDITING SYSTEM

(71) Applicant: Google Inc., Mountain View, CA (US)

(72) Inventor: Nils Kokemohr, Hamburg (DE)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 13/920,555

(22) Filed: Jun. 18, 2013

(65) Prior Publication Data
US 2013/0346898 A1 Dec. 26, 2013

Related U.S. Application Data

(60) Provisional application No. 61/662,020, filed on Jun. 20, 2012.

(51) Int. Cl.
| | |
|---|---|
| *G06F 3/048* | (2013.01) |
| *G06F 3/0484* | (2013.01) |
| *G06F 3/0482* | (2013.01) |
| *G06F 3/0486* | (2013.01) |

(52) U.S. Cl.
CPC .......... *G06F 3/04845* (2013.01); *G06F 3/0482* (2013.01); *G06F 3/0486* (2013.01)

(58) Field of Classification Search
CPC .................................................. H04N 1/00132
USPC ......................................................... 715/769
See application file for complete search history.

(56) References Cited

U.S. PATENT DOCUMENTS

| | | | |
|---|---|---|---|
| 6,344,907 B1 | 2/2002 | Watanabe et al. | |
| 7,062,497 B2 * | 6/2006 | Hamburg et al. | |
| 7,730,043 B1 * | 6/2010 | Bourdev ....................... 707/695 |
| 2005/0216841 A1 | 9/2005 | Acker et al. | |
| 2009/0207254 A1 * | 8/2009 | Tomat et al. ............... 348/207.1 |
| 2010/0058244 A1 | 3/2010 | Wang | |

OTHER PUBLICATIONS

International Bureau of WIPO; International Report on Patentability and Written Opinion for PCT/US13/46487; dated Dec. 23, 2014; 5 pages.
International Search Report, dated May 27, 2014 for PCT Application No. PCT/US2013/046487.

* cited by examiner

*Primary Examiner* — Omar Abdul-Ali
(74) *Attorney, Agent, or Firm* — IP Spring

(57) ABSTRACT

Implementations generally relate to applying image enhancements. In some implementations, a method includes providing a selection of image enhancements to a user. The method also includes causing the image enhancements to be displayed as a collection of icons, where the collection includes icons representing different image enhancements, and where one or more of the image enhancements are applied to one or more images. The method also includes enabling the user to select any icon in the collection in order to modify the collection, where the selected icon has a corresponding selected image enhancement. The method also includes hiding icons associated with image enhancements that are subsequent image enhancements relative to the selected image enhancement. The method also includes deactivating the subsequent image enhancements corresponding to the hidden icons.

20 Claims, 18 Drawing Sheets (801)

(802)

COMPARTMENTALIZED IMAGE EDITING SYSTEM

CROSS REFERENCE TO RELATED APPLICATIONS

This application claims priority to Provisional application No. 61/662,020 entitled "A COMPARTMENTALIZED IMAGE EDITING SYSTEM," filed Jun. 20, 2012, which is hereby incorporated by reference as if set forth in full in this application for all purposes.

BACKGROUND

Image editing systems for various consumer electronic devices and personal computers enable a user to manipulate images. Such image editing systems typically require the user to understand complicated and difficult instructions to manipulate the image. This level of knowledge places advanced editing features out of the grasp of the average user.

SUMMARY

Implementations generally relate to applying image enhancements to images. In some implementations, a method includes providing a selection of image enhancements to a user. The method also includes causing the image enhancements to be displayed as a collection of icons, where the collection includes icons representing different image enhancements, and where one or more of the image enhancements are applied to one or more images. The method also includes enabling the user to select any icon in the collection in order to modify the collection, where the selected icon has a corresponding selected image enhancement. The method also includes hiding icons associated with image enhancements that are subsequent image enhancements relative to the selected image enhancement. The method also includes deactivating the subsequent image enhancements corresponding to the hidden icons.

With further regard to the method, in some implementations, the collection is positioned in a predetermined location relative to one or more image thumbnails to indicate that one or more image enhancements of the collection are applied to one or more images associated with the one or more image thumbnails. In some implementations, the icons of the collection are sorted in an order such that the corresponding image enhancements are applied to each of the one or more images. In some implementations, the method also includes enabling the user to modify the selected image enhancement. In some implementations, the method also includes enabling the user to reactivate one or more deactivated image enhancements. In some implementations, the method also includes enabling the user to transfer the collection from one image thumbnail to one or more other image thumbnails in order to apply the image enhancements associated with the collection to images corresponding to the one or more other image thumbnails. In some implementations, the method also includes enabling the user to transfer the collection from one image thumbnail to one or more other image thumbnails in order to apply the image enhancements associated with the collection to images corresponding to the one or more other image thumbnails, and where a transferring of the collection is based on one of a drag-and-drop operation or a copy-and-paste operation. In some implementations, the collection includes a thumbnail of at least one image. In some implementations, the collection includes an icon representing a software camera module. In some implementations, the collection includes an icon representing an output module.

In some implementations, a method includes providing a selection of image enhancements to a user. The method also includes causing the image enhancements to be displayed as a collection of icons, where the collection includes icons representing different image enhancements, where one or more of the image enhancements are applied to one or more images, where the collection is positioned in a predetermined location relative to one or more image thumbnails or image previews to indicate that one or more image enhancements of the collection are applied to one or more images associated with the one or more image thumbnails, and where the icons of the collection are sorted in an order such that the corresponding image enhancements are applied to each of the one or more images. The method also includes enabling the user to select any icon in the collection in order to modify the collection, where the selected icon has a corresponding selected image enhancement. The method also includes hiding icons associated with image enhancements that are subsequent image enhancements relative to the selected image enhancement. The method also includes deactivating the subsequent image enhancements corresponding to the hidden icons.

With further regard to the method, in some implementations, the method also includes enabling the user to modify the selected image enhancement. In some implementations, the method also includes enabling the user to reactivate one or more deactivated image enhancements. In some implementations, the method also includes enabling the user to transfer the collection from one image thumbnail to one or more other image thumbnails in order to apply the image enhancements associated with the collection to images corresponding to the one or more other image thumbnails.

In some implementations, a system includes one or more processors, and logic encoded in one or more tangible media for execution by the one or more processors. When executed, the logic is operable to perform operations including: providing a selection of image enhancements to a user; causing the image enhancements to be displayed as a collection of icons, where the collection includes icons representing different image enhancements, and where one or more of the image enhancements are applied to one or more images; enabling the user to select any icon in the collection in order to modify the collection, where the selected icon has a corresponding selected image enhancement; hiding icons associated with image enhancements that are subsequent image enhancements relative to the selected image enhancement; and deactivating the subsequent image enhancements corresponding to the hidden icons.

With further regard to the system, in some implementations, the collection is positioned in a predetermined location relative to one or more image thumbnails to indicate that one or more image enhancements of the collection are applied to one or more images associated with the one or more image thumbnails. In some implementations, the icons of the collection are sorted in an order such that the corresponding image enhancements are applied to each of the one or more images. In some implementations, the logic when executed is further operable to perform operations including enabling the user to modify the selected image enhancement. In some implementations, the logic when executed is further operable to perform operations including enabling the user to reactivate one or more deactivated image enhancements. In some implementations, the logic when executed is further operable to perform operations including enabling the user to transfer the collection from one image thumbnail to one or more other image thumbnails in order to apply the image enhancements associated with the collection to images corresponding to the one or more other image thumbnails.

DETAILED DESCRIPTION

Implementations for applying image enhancements are described herein. In various implementations, a system provides a selection of image enhancements to a user. The system then causes the image enhancements to be displayed as a stack of icons, where the stack includes icons representing different image enhancements, and where one or more of the image enhancements are applied to one or more images. In some implementations, the stack is positioned in a predetermined location relative to one or more image thumbnails or image previews to indicate that one or more image enhancements of the stack are applied to one or more images associated with the one or more image thumbnails. In some implementations, the icons of the stack are sorted in an order such that the corresponding image enhancements are applied to each of the one or more images.

The system then enables the user to select any given icon in the stack in order to modify the stack, where the selected icon has a corresponding selected image enhancement. The system then hides icons associated with image enhancements that are subsequent image enhancements relative to the selected image enhancement. The system then deactivates the subsequent image enhancements corresponding to the hidden icons. In various implementations, the system enables the user to modify the selected image enhancement. In various implementations, the system enables the user to reactivate one or more deactivated image enhancements. In various implementations, the system enables the user to transfer the stack from one image thumbnail to one or more other image thumbnails in order to apply the image enhancements associated with the stack to images corresponding to the one or more other image thumbnails.

Implementations provide a compartmentalized image editing system that is simple to operate and that is operable with a single hand. Various implementations provide an image editing system for all edits made by a user, where the image editing system may be compartmentalized into edit or image enhancement steps, including, but not limited to size and aspect ratio changes, color filters, detailed changes, etc.

As described in more detail below, edits/image enhancements are displayed as a stack, represented by one symbol for a multitude of edits. These stacks provide the user with the ability to: copy the stack, drag-and-drop the stack, delete the stack, save the stack, export the stack to an off-line storage location, and expand the stack to display individual steps.

In various implementations, once the stack is expanded, other operations can be performed, such as closing the stack, removing/changing a single edit/image enhancement, reverting the image back to a desired edit (e.g., a subset of the stack), navigating through the edits in the stack, and comparing the results of edits at different points in the edit history, etc.

Figure 1:
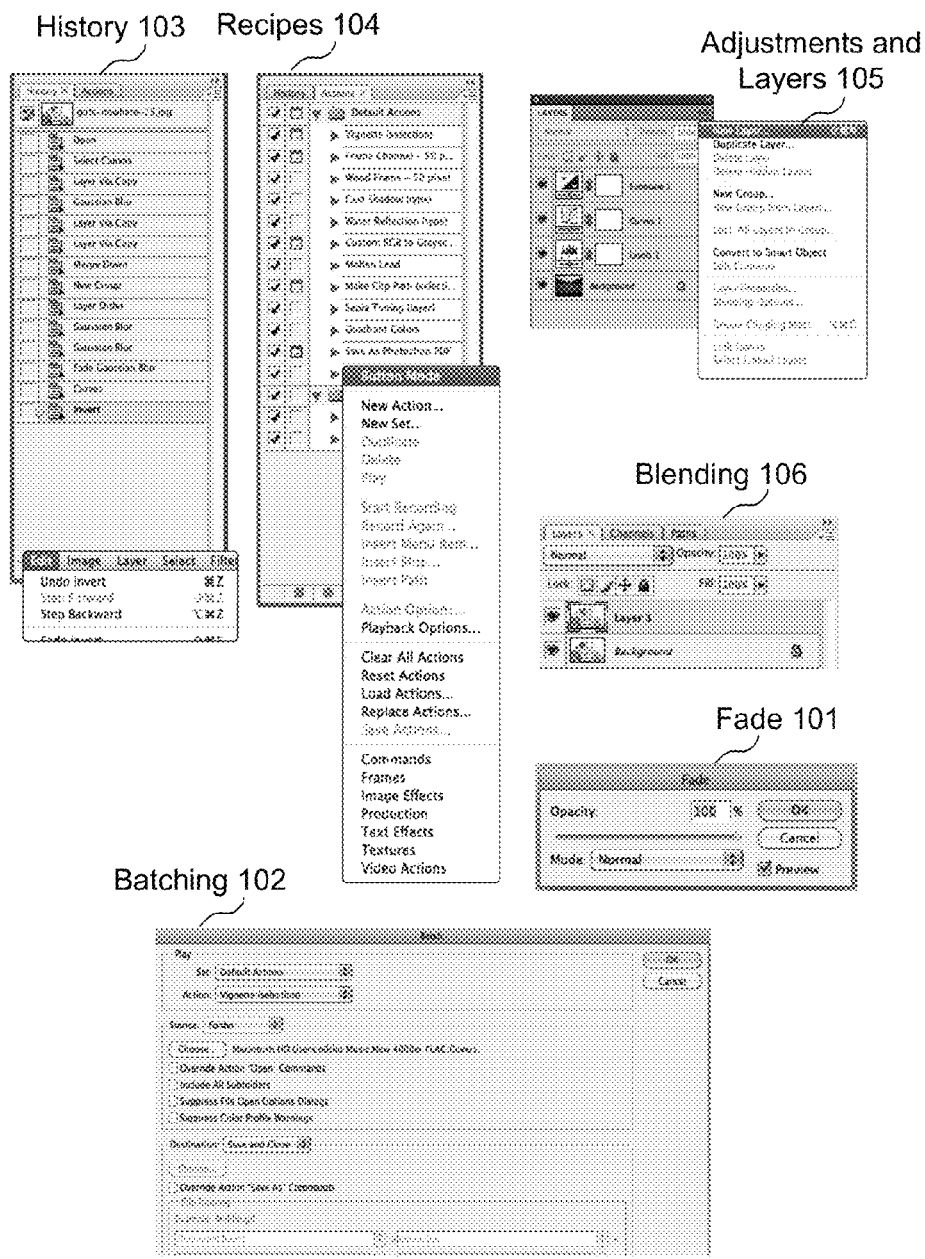
FIG. 1 is an example diagram showing a conventional edit management user interface.

FIG. 1 is a diagram showing a conventional edit management user interface. As shown, the interface includes a plethora of different functions for edit management such as: actions, also known as macros, layers, adjustment layers, fade-last-effect command, opacity blending, layer masks, batch processing, smart layers, a history palette, and undo and redo functionality. All of these functions generally have separate windows or operating panels or dedicated screen areas for managing the actual edits that the user has applied to the image, as can be seen in FIG. 1.

FIG. 1 shows a fade dialog 101 that allows a user to partially reduce the application strength (opacity) of the last applied effect, and which includes a blending mode. A batching dialog 102 is an abstract sheet of data that a user sets up if one action (recorded set of image edits) is to be applied to a series of images (e.g., batch processing). A history dialog 103 is shown, which shows a history of edits applied to an image. A recipes dialog 104 includes a list of macros, or actions, that a user may have recorded. The expanded recipes dialog 104 menu shows options of tasks that can be performed with actions. Also shown is an adjustments and layers dialog 105, which shows optional adjustments and layers or masks being applied to an image. However, contrary to the history dialog 103 or the recipes dialog 104, the edits are not shown in a timely sequence. Blending dialog 106 includes blending options for an image edit (an adjustment layer or a layer, in this case), that is different from the fade dialog 101.

The complexity of the image edit management shown in FIG. 1 includes screenshots similar to various image applications that all follow a similar style of image edit management. Newer image editors simplify the management by offering only one fixed series of edits to make data management simpler. The majority of conventional image editors simply omit edit management features for the sake of simplicity.

Unlike conventional image applications, implementations describe herein enable a variety of tasks such as keeping the image unaffected. Such tasks may include, for example: applying all edits, while changing one prior edit slightly; applying all edits of one image to another image; undoing an applied edit in the lower half of the image; and applying what was applied to one image to a larger number of images, while excluding a specific single effect on images X, Y and Z. Implementations achieve these tasks without a vast amount of training in a particular image editor or years of trial and error experience. As described in more detail herein, implementations provide a compartmentalized image editing system that is simple to operate, and operable with a single hand.

Various implementations provide a device and a method for a remote control for portable electronic devices that is simple to operate, and operable with a single hand. Various implementations provide a system including one or more portable electronic devices and one or more remote controls for portable electronic devices.

Figure 2:
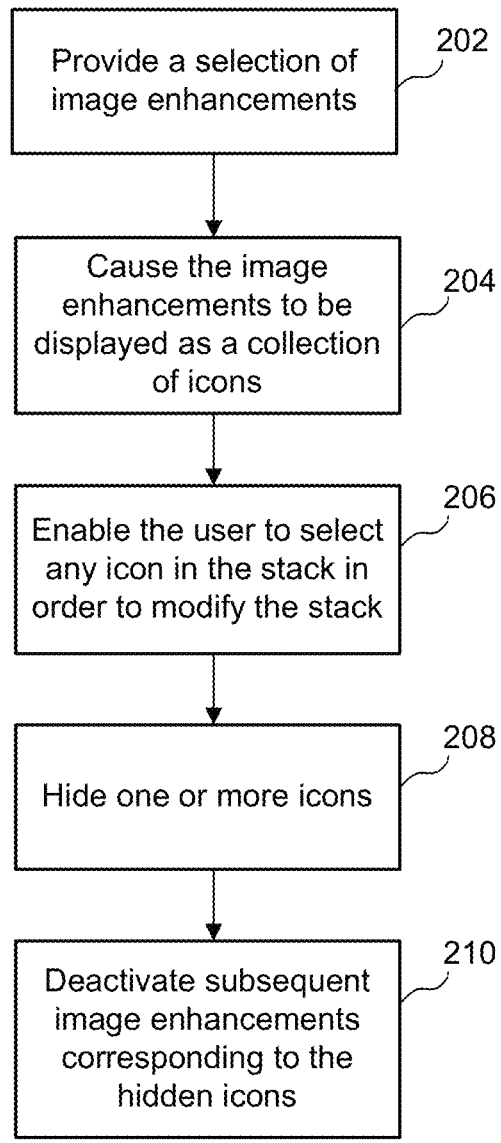
FIG. 2 illustrates an example simplified flow diagram for applying image enhancements to images, according to some implementations.

FIG. 2 illustrates an example simplified flow diagram for applying image enhancements to images, according to some implementations. In various implementations, a method is initiated in block 202, where a system (such as server device 1800 of FIG. 18) provides a selection of image enhancements to a user. In various implementations, the terms "enhancement" and "image enhancement" refer to an edit. Also, the term "effect" refers to an edit. As such, the terms and phrases "enhancement," and "image enhancement," "edit," and "effects" may be used interchangeably.

In various implementations, the term "edit" refers to a single modification and/or enhancement applied to an image, provided as one unit to the user, or the graphical representation thereof. For example, edits may include actions including blur, sharpen, drama, invert, crop, rotate, inpaint, re-target, resolution change, rotate, selective adjust, auto adjust, vintage effect, etc.

In block 204, the system causes the image enhancements to be displayed as a collection, or "stack" of icons. As illustrated below in connection with FIGS. 3A and 3B, in various implementations, the stack includes icons representing different image enhancements, where one or more of the image enhancements are applied to one or more images.

Figure 3A:
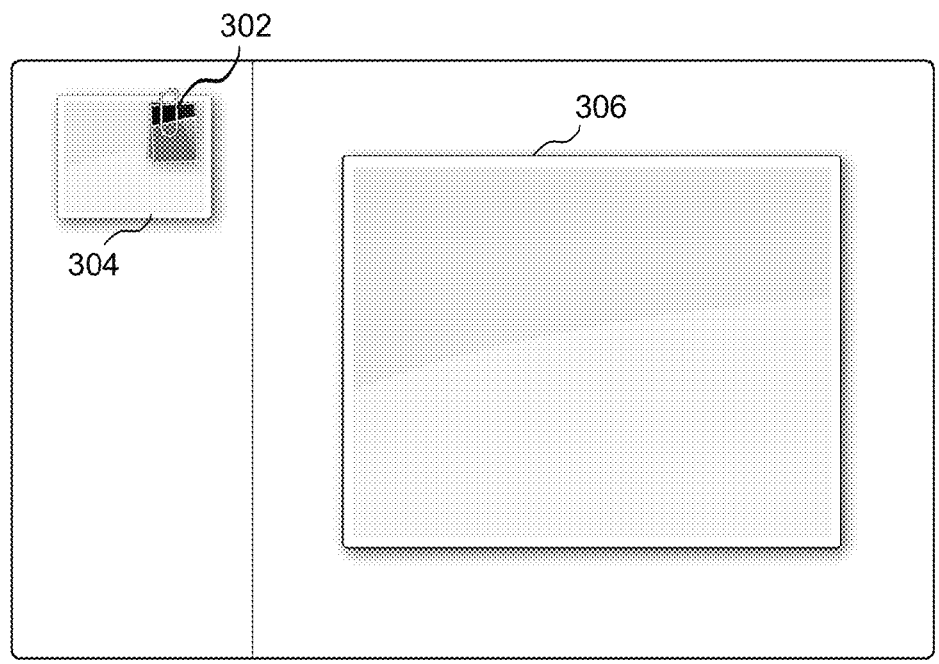
FIGS. 3A and 3B illustrate an example application of an edit stack to an image, according to some implementations.
Figure 3B:
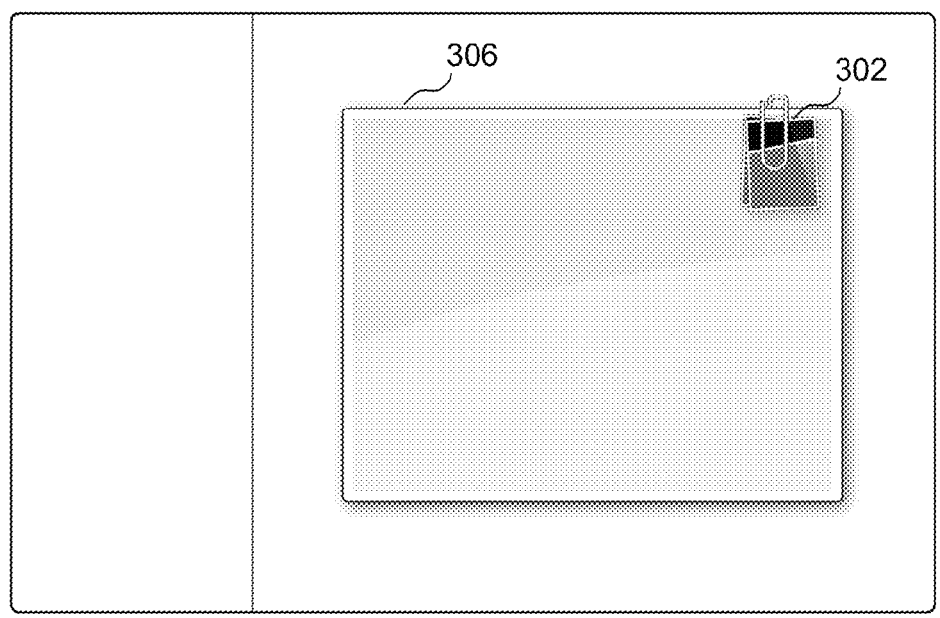

FIGS. 3A and 3B illustrate an example application of an edit stack to an image, according to some implementations. Referring to FIG. 3A, a user interface 300 includes a stack of icons 302 associated with an image thumbnail 304, or image preview. While stack 302 includes icons as in a "stack of icons," stack 302 may also refer to a set of image enhancements as in a "stack of image enhancements," as each icon represents a different image enhancement, where one or more of the image enhancements are applied to one or more images, such as image 306, or a "main image" 306. As shown, user interface 300 shows image 306 (which is a "main" image in a main portion) image thumbnail 304 at the top left, and edit stack 302 graphically positioned in the thumbnail.

In various implementations, the term "thumbnail" may refer to a smaller version of an image displayed on a screen. A thumbnail may be suitable to represent an image, and need not be required to be of sufficient resolution to display the image details.

Alternatively, referring to FIG. 3B, in some implementations, user interface 300 may display main image 306 and edit stack 302 positioned in main image 306, thereby using some space in the vicinity of the main image 306, and reducing/eliminating the necessity of having a thumbnail.

As illustrated in FIGS. 3A and 3B, the stack may be positioned in a predetermined location (e.g., superimposed, etc.) relative to one or more image thumbnails or relative to main images in order to indicate that one or more image enhancements of the stack are applied to one or more images associated with the one or more image thumbnails and/or images.

In various implementations, the term "stack" may refer to a set, group, collection, and/or entirety of (or a graphical representation thereof) a series of ordered edits applied to an image. In various implementations described herein, the terms and phrases "stack," "edit stack," "stack of edits," "set of edits," "group of edits," and "collection of edits" may be used interchangeably. In various implementations, the terms "stack" and "collection" may be used interchangeably. Also, the terms "stack" and "collection" may refer to image enhancements and/or to icons representation such image enhancements, depending on the context. For example, in some implementations, the phrases "stack of icons" and "collection of icons" may be used interchangeably. Also, as indicated above, a "stack" may refer to a "stack of icons" or a "stack of image enhancements," depending on the context.

Referring again to FIG. 2, in block 206, the system enables the user to select any icon in the stack in order to modify the stack, where the selected icon has a corresponding selected image enhancement. Again, as indicated above, the term "stack" may refer to a collection icons or a collection of image enhancements, depending on the context. Example implementations are described in more detail below in connection with FIGS. 4A and 4B.

Figure 4A:
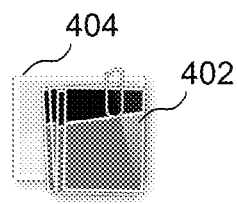
FIG. 4A illustrates an example edit stack in a collapsed state, according to some implementations.

FIG. 4A illustrates an example edit stack in a collapsed state, according to some implementations. As shown, an edit stack 402 is associated with image thumbnail 404. In various implementations, the system causes the icons of a stack to be sorted in an order such that the corresponding image enhancements are applied to each of the one or more images. In various implementations, icons representing subsequent image enhancements are superimposed over icons representing preceding image enhancements. For example, referring to FIG. 4A, in some implementations, an image enhancement associated with a bottom-most icon in stack 402 may be applied first. Conversely, an image enhancement associated with a top-most icon in stack 402 may be applied last.

Figure 4B:
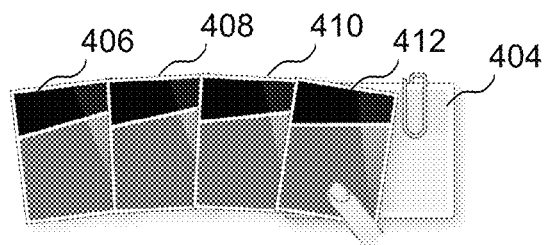
FIG. 4B illustrates an example edit stack in an expanded state, according to some implementations.

FIG. 4B illustrates an example edit stack in an expanded state, according to some implementations. In some implementations, the user may expand edit stack 402 to show individual icons 406, 408, 410, and 412 associated with respective image enhancements that are associated with image thumbnail 404. In various implementations, the user may expand edit stack 402 by selecting edit stack 402. For example, touching edit stack 402 on a touch screen expands edit stack 402 from a collapsed state (as shown in FIG. 4A) to an expanded state (as shown in FIG. 4B). Subsequently, the user may select any icon in the stack in order to modify the stack. For example, as shown in FIG. 4B, a finger shown is selecting icon 412 by touching icon 412 on a display screen. This enables any image enhancements associated with icon 412 to be modified.

In various implementations, the phrase "going to an edit" may involve: (a) selecting an effect to be the active effect, and making the effect available for context menus and other operations (e.g., modification operations, etc.); (b) indicating graphically that subsequent effects are no longer active; and (c) updating a preview of the image to show the effects of the active effect and previous effects and to no longer show the effects subsequent to the selected effect.

Note that the action of "selecting" an effect in various implementations may be different from "going to an effect." In some implementations, the action of selecting an effect may be a part of "going to an effect."

As indicated above, in various implementations, the system causes the icons of a stack to be sorted in an order such that the corresponding image enhancements are applied to each of the one or more images. For example, referring to FIG. 4B, in some implementations, an image enhancement associated a left-most icon may be applied first. Conversely, an image enhancement associated a right-most icon may be applied last.

As described in various examples herein, in various implementations, the system enables the user to modify the selected image enhancement. In various implementations, as described and illustrated herein in various examples, an edit stack is a series (e.g., 1 . . . N) of ordered image enhancements, where only one image enhancement is active (e.g., selected) for modifying, where the selected image enhancement is the only image enhancement that is currently accessible to the user for receiving image enhancement modifications.

In various implementations, a new edit can only be added after edit A, and will hence have the number A+1. Hence, it is a characteristic of an edit stack that an edit which a user is currently adjusting (e.g., fine tuning, refining, applying parameter changes to, etc.) is always the last image enhancement in the processing chain of edits that needs to be processed by a computer in order to display the preview. In various implementations, edit steps subsequent to the selected edit are hidden in the edit stack, e.g., the graphical representation of the subsequent steps is suitable to indicate a state of inactiveness of the subsequent edit steps, and the associated image preview does not reflect the edits of hidden edits subsequent to the selected one.

Referring again to FIG. 2, in block 208, the system hides one or more icons associated with image enhancements that are subsequent image enhancements relative to the selected image enhancement. Example implementations are described in more detail below in connection with FIGS. 4B and 4C.

Figure 4C:
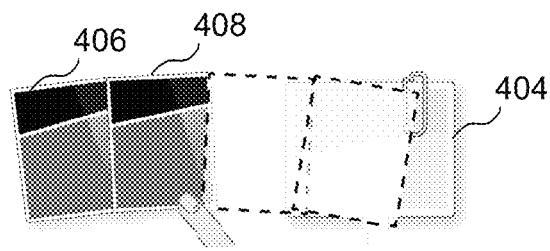
FIG. 4C illustrates example edit stack in an expanded state after an icon is selected, according to some implementations.

FIG. 4C illustrates example edit stack in an expanded state after an icon is selected, according to some implementations. Referring to FIG. 4B, in some implementations, if the user selects icon 408, the system hides icons 410 and 412 associated with image enhancements that are subsequent image enhancements relative to the selected image enhancement. As shown in FIG. 4C, and as described in more examples herein, subsequent image enhancements may be hidden by being grayed out or completely hidden in the stack graphic. In various implementations, the system causes the image enhancement associated with the top-most or right-most icon to be the one image enhancement that can be changed, thereby keeping the requirement for real time updates of edits low as only one image enhancement needs to be updated during an editing session of the image.

In block 210 of FIG. 2, the system deactivates the subsequent image enhancements corresponding to the hidden icons. In other words, the subsequent image enhancements corresponding to the hidden icons will no longer be shown or previewed on the image, unless reactivated. In various implementations, the system enables the user to reactivate one or more deactivated image enhancements. Various examples are described in more detail below in connection other figures.

Although the steps, operations, or computations of the flow diagrams may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While a system is described as performing the steps as described in the implementations herein, any suitable component or combination of components of the system or any suitable processor or processors associated with system may perform the steps described.

Figure 5:
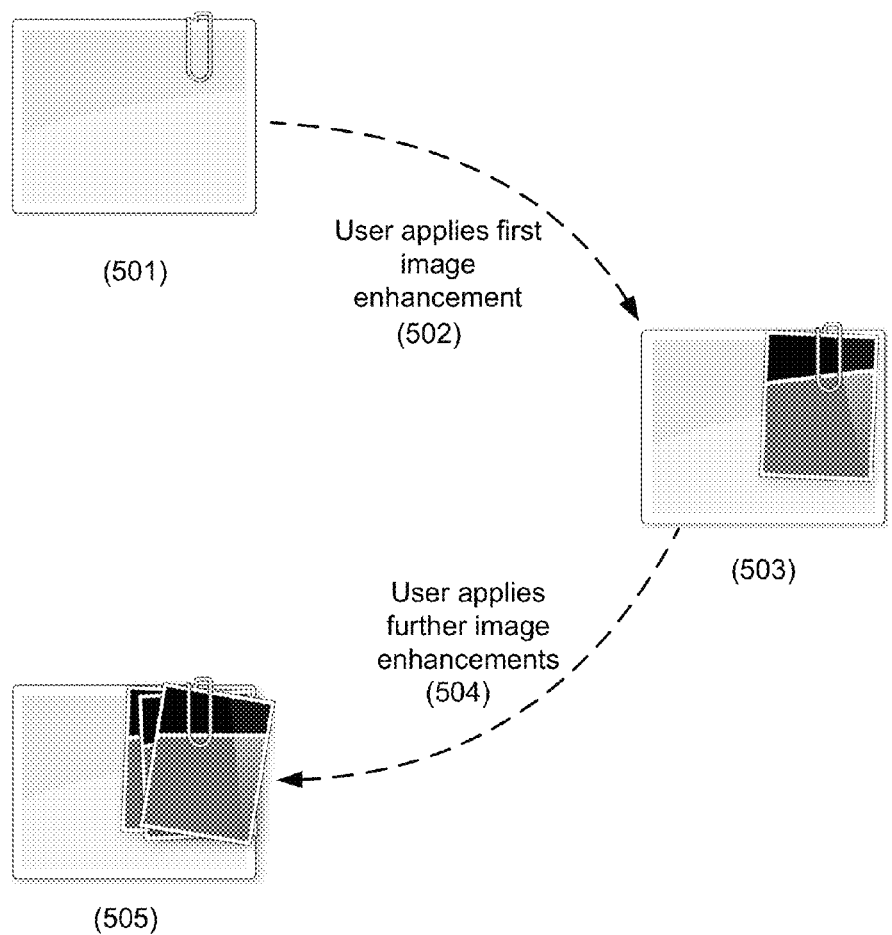
FIG. 5 is a simplified diagram of an example image in relation to zero, one, or more edit stacks, according to some implementations.

FIG. 5 is a simplified diagram of an example image in relation to zero, one, or more edit stacks, according to some implementations. In various implementations, an image 501 may be represented by a thumbnail or optionally with a placeholder for an empty edit stack. In some implementations, a paper clip icon may be used to indicate where a user can apply an edit function 502 to apply one or more image enhancements. The edit may be graphically represented as a trivial single, image enhancement-stack 503 of the image. As the user applies further edits 504 to the image 501, the additional edits 505 may be added to the graphical representation of the stack.

As indicated above, an edit stack may be a set of icons each representing an edit/image enhancement. In various implementations, an edit stack is not a "list." Rather, the stack, from a visual/user interface standpoint, has a characteristic such that selecting (e.g., clicking or tapping) on the stack is an action that refers to the entire stack, as opposed to elements within a list. In other words, selecting the stack enables actions that target the entirety of a set of edits.

Tapping, tapping a second time, tap-and-holding or double tapping or clicking, right clicking, clicking and holding may all cause various operations to be performed on the stack. Various implementations may assign different user operations to different actions of the following list: stack becomes selected; opening a "copy" and "paste" menu for copying and pasting the stack; opening a "reset" and "delete edits" menu; converting the stack into a list; accessing single elements (edits) within the list for deleting, copying, reediting or readjustment; dragging and dropping a stack towards another image; and allowing the user to jump back to an earlier state of edits, thereby disabling and not showing the results of subsequent edits.

An additional characteristic of the edit stack is that, unlike conventional edit lists, performing operations on the entire series of edits as a whole is easy and intuitive. Also, an access to individual edits is only slightly more complex compared to access to the entire series of edits, which minimizes unintended edits. Conventional systems that have a list (not a stack) as their center make accessing the list as a whole more complex.

In various implementations, the user need not differentiate between undoing a series of edits and re-accessing a previous edit. This enables the user to edit various image states that may be difficult to comprehend. The users may keep track of what is currently applied to what image/edit/layer/channel/mask, etc. Processing multiple edits at the same time is particularly beneficial for image editing systems in which processing power is limited, or where the image edits are of a computationally intense nature.

Figure 6:
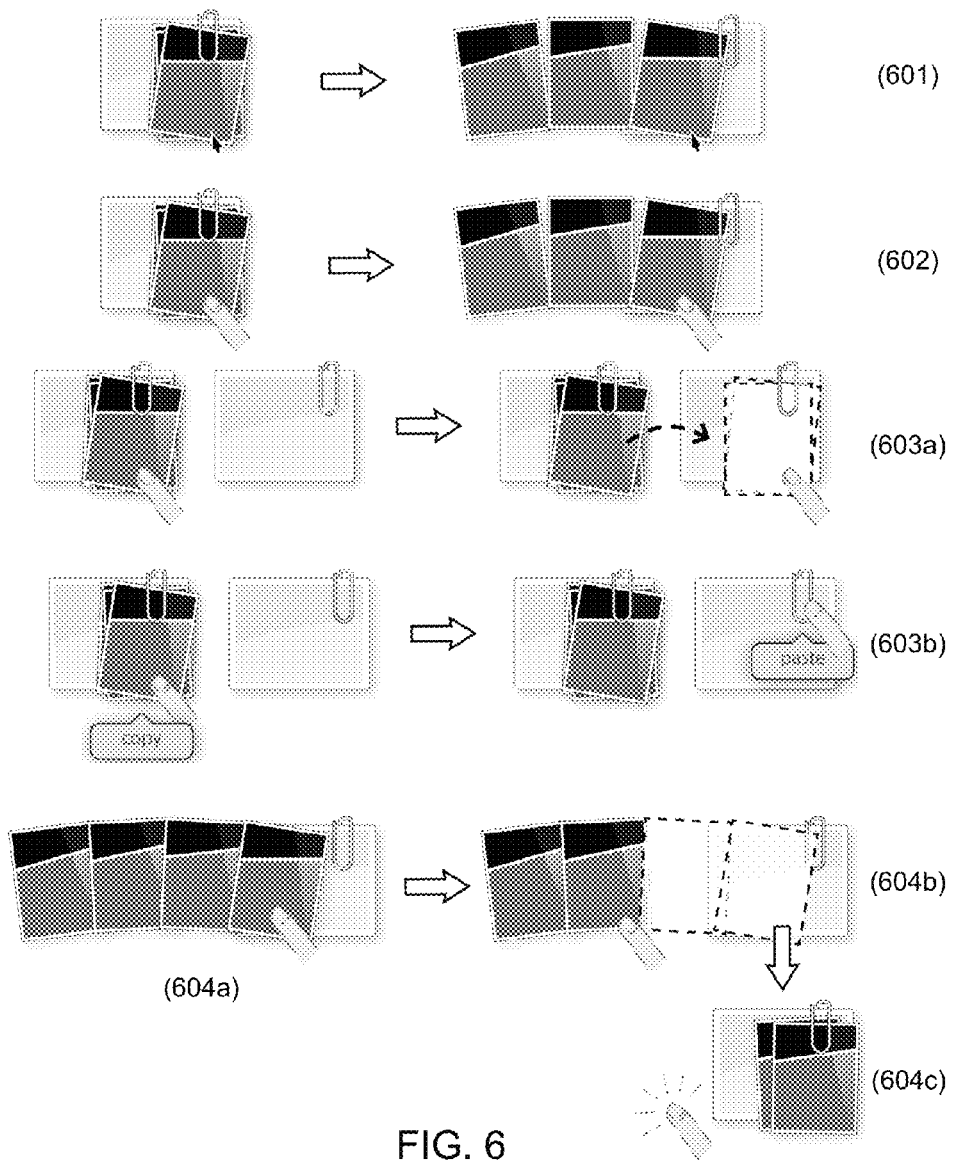
FIG. 6 illustrates example edit operations on a stack, according to some implementations.

FIG. 6 illustrates example edit operations on a stack, according to some implementations. As shown, the user is provided with various benefits from such edit stacks, even with limited input control (e.g., using an index finger as opposed to a mouse). Also, the edit stack can be shown both in a collapsed form/state and in an expanded state as shown in examples 601 and 602. In various implementations, the user can see the edit stack as a whole, and can easily perform actions on the edits of an image as a whole. For example, a mouse click 601 or a finger tap 602 on the edit stack can expand the edits so that a user can see which edits are inside the stack.

In some implementations, an edit stack may be copied from one image and be applied to another image as shown in examples 603a and 603b. The edit stack can be copied from one image to another image by drag-and-dropping as shown in example 603a. Also, the edit stack can be copied from one image to another image by copying-and-pasting as shown in example 603b.

Additionally, the user can expand an edit stack 604a, then tap on one of the intermediate edits (edit number 2/second edit from the left) as shown in 604b, and can tap anywhere to close the expanded edits to undo the following edits (here edits number 3 and 4) as shown in 604c. Note that in example 604b, the user can preview the image status as with 2 edits being applied before "committing" to the undoing of subsequent effects. Obviously, a tap on the last effect in status 604b will keep the image with all 4 edits remaining active.

In various implementations, the user can also use an expanded stack to undo edits 604a-604c. Tapping on an edit within the series of expanded edits within the stack makes the software "go to" that edit.

In various implementations, the "go to" action may include instructions operable on a computer to perform the steps of: reverting the edits to the selected edit, including the selected edit; re-editing steps; and modifying masking and blending. There is no need for a dual concept for selecting edits versus hiding/undoing. This saves widgets, buttons, screen real estate and user experience complexity.

Figure 7:
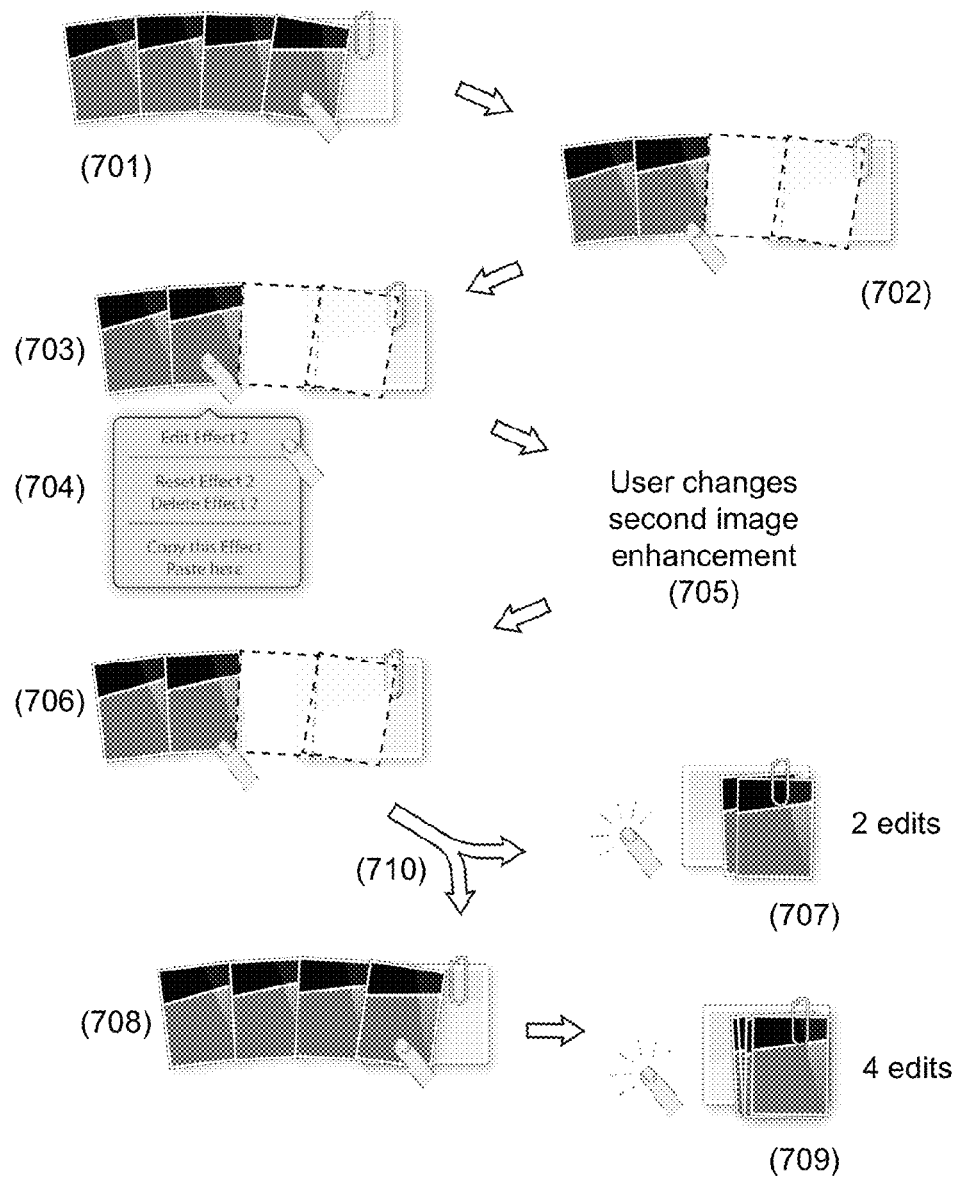
FIG. 7 illustrates an example re-editing of the stack, according to some implementations.

FIG. 7 illustrates an example re-editing of the stack, according to some implementations. As shown, an image with 4 edits in the edit stack can be expanded as shown in example 701. If a user taps on the 2nd edit (from the left) as shown in example 702, instructions to deactivate subsequent effects are executed on the processor. In some implementations, if the user taps on the 2nd edit a second time 703, instructions for displaying a menu 704 are executed.

Moreover, the user can fine-tune the parameters such as sliders of a selected effect (e.g., changing the second image enhancement) 705, after tapping on "edit effect 2" in the menu 704. The program can display an expanded edit stack 706, with 2 active edits and 2 inactive edits after the user has concluded re-editing the second enhancement. Note: the main image preview (not shown) will now differ from the one in 703. In other words, the main image changes as subsequent image enhancements are inactive/de-activated. In some implementations, the screen may include a main image preview where the user sees the status of the enhancements currently applied. Alternatively, in some implementations, the thumbnail/image representation with which the edit stack is associated may also display a preview of the currently applied effects. In some cases, the user is presented with several options. For example, the user can have two choices 710 displayed as shown in examples 707 and 708.

In one example case, the user has tapped on the last effect 708, thus prompting software of the system to execute instructions to apply effect number 3 and number 4 on the image again. When closing the edit stack 709 by tapping anywhere outside the edit stack, the user has now a closed, full edit stack but with changes applied to effect number 2.

Alternatively, the user can, after having reverted the edits to step number 2 (702) and after having changed effect number 2 (705), can choose to keep only effects number 1 and number 2. This is particularly useful for all users that, after re-editing, a step 705 may have changed their inspirations on what to do with the images without forcing the users to re-apply all remaining edits 709 in what can be frustrating user experiences.

Figure 8:
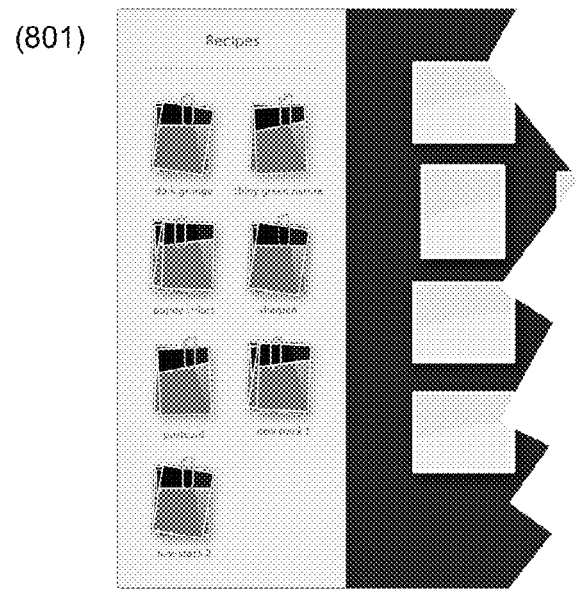
FIG. 8 illustrates an example library of stacks that can be applied to any image, according to some implementations.
Figure 8:
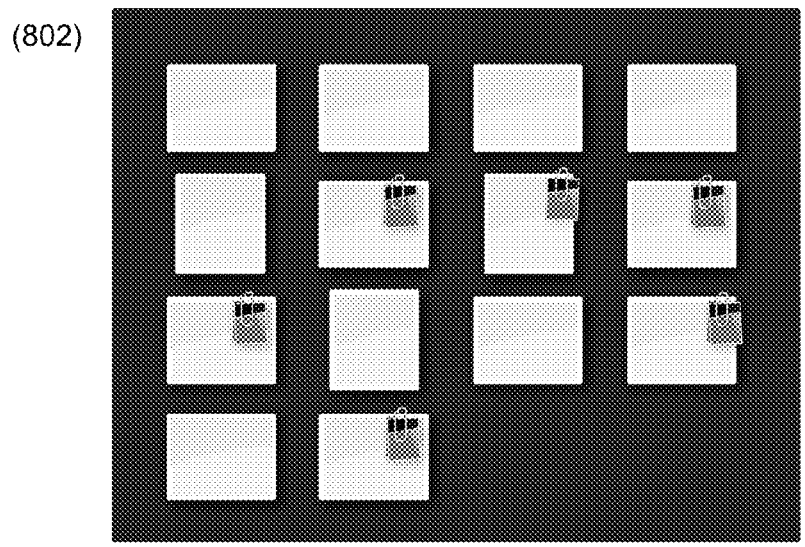

FIG. 8 illustrates an example library of stacks that can be applied to any image, according to some implementations. As shown, an interface with a dedicated area 801 for collecting recipes is displayed. Recipes can be collected by dragging-and-dropping or by copying-and-pasting, or by other means of adding recipes to the display 801 area. In various implementations, the term "recipe" refers to a series of image edits that lend themselves to be applied (as a macro or "action") to other images. The terms "recipes" and "stacks" may be used interchangeably.

Alternatively, the edits can be displayed only on images where the edits are applied (e.g., in the user's image library 802). This makes it no longer necessary to have a separate recipe library. Also, the user no longer needs to name recipes (as it may be necessary in display 801). Furthermore, the user can locate/find a recipe right where it was last used. Users may more easily locate the image where a recipe was last used than a recipe within a recipe library.

Additionally, edit stacks can be superimpositions over image thumbnails. This provides the user with the capability to copy (copy & paste or drag-and-drop) an edit from one image to another image or to several other images, even inside an image collection. This means the user need not manage a separate section of his personal collection of recipes 801, but can find the recipes right where it was last used, conveniently alongside an image where the effect is already applied, and which is likely an image on which the edits make the most sense.

Some implementations enable an edit stack to both represent the edits that have been applied to an image (thereby possibly functioning as an undo history), and as a recipe that can be transferred to other images.

Figure 9:
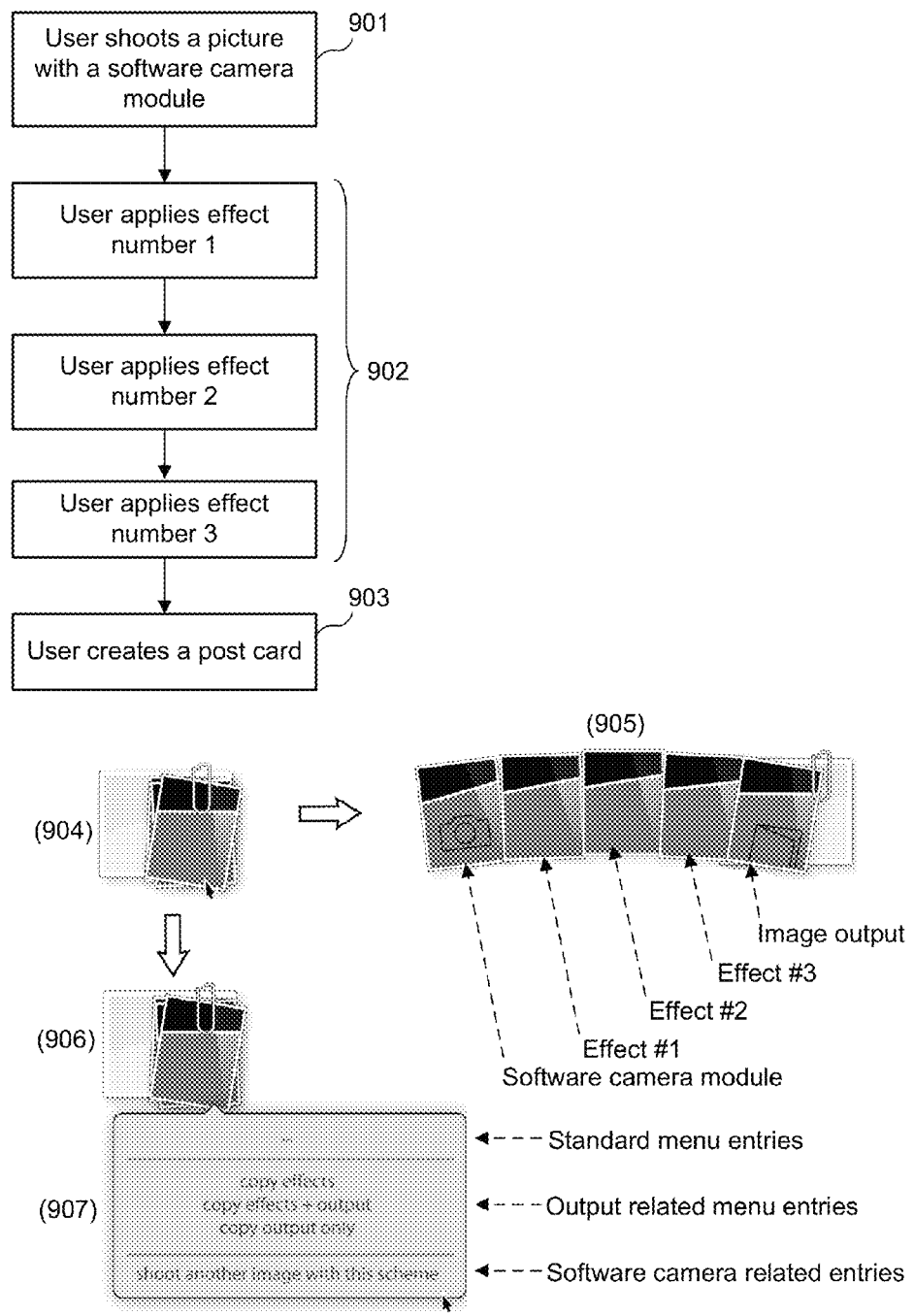
FIG. 9 illustrates an example recipe with a software camera module, effects and output, according to some implementations.

FIG. 9 illustrates an example recipe with a software camera module, effects and output, according to some implementations.

As shown, in some implementations, the user first takes a picture 901 with the software camera module. The user applies effects to the image 902. Next, the user outputs the image 903. Then, a graphical representation of the image 904 (thumbnail) with the edits (e.g., 5 edits) is displayed, three of which are effects in the conventional sense. Next, the opened edit stack 905 is displayed, where the first element is a software camera and the last is an output.

As shown in 905, a stack may include one or more of a thumbnail of at least one image, an icon representing a software camera module, and an icon representing an output module. In various implementations, any one of these icons including any one icon associated with an image enhancement may be positioned in any one location in the stack, depending on the particular implementation (e.g., bottom/left-most position, any middle position, top/right-most position, etc.). Then, the image with the edit stack is displayed, when the user has clicked/tapped 906 onto said stack.

Next, a menu 907 is displayed when the user clicks/taps 906 and specific options are displayed in relation to the camera module or the output which is included within this edit stack. The user can copy all effects, or can copy all effects plus the output (for instance, if he wants to make four matching coffee mugs with different images, but all images having the same style), the user can copy the output module by itself. In addition, the menu 907 allows the user to shoot another image with the same camera module and the same effects. For example, a user has used a long exposure camera effect to make an image with streaky, soft, dramatic clouds. Then he uses a black and white filter and a 'drama' filter to make the image more impressive. With the "shoot another image with this scheme" option the user can shoot a series of different images with the same impressive photographic style automatically.

As shown, the edit stack can be applied beyond straight forward edits. In various implementations, the software camera module is an application or a part of an application that allows the user to shoot a picture, typically dedicated to a specific purpose (Raw, high dynamic range (HDR), panorama, long exposure, etc.), while 'output' may refer to anything that a user may have created out of an image, such as merchandise (mouse pad, coffee mug, post card, poster), or a virtual product (virtual greeting card, etc.) or a private output (poster print, etc.).

In various implementations, the term "software camera (module)" refers to a piece of software that functions as a software camera, often times (but not necessarily) serving a specific purpose, such as a high dynamic range (HDR) camera, panorama camera etc. Software camera modules may have parameters to adjust the image recording, some of which may be applicable after the shoot.

In various implementations, the term "output" refers to anything that can be produced out of an image, such as a postcard, a poster, a coffee mug, an album, a virtual postcard, a nicely formatted virtual message or blog post, etc. Therefore, a software camera can be understood as an Edit that needs no input image, but rather creates its own image, including using camera optics or accessing image data from other (cloud, online, video frame grabbing, etc.) sources.

As described in more detail below, in various implementations, the system enables the user to transfer an edit stack from one image thumbnail to one or more other image thumbnails in order to apply the image enhancements associated with the stack to images corresponding to the one or more other image thumbnails. Furthermore, in various implementations, a transferring of the stack is based on one of a drag-and-drop operation or a copy-and-paste operation.

Figure 10:
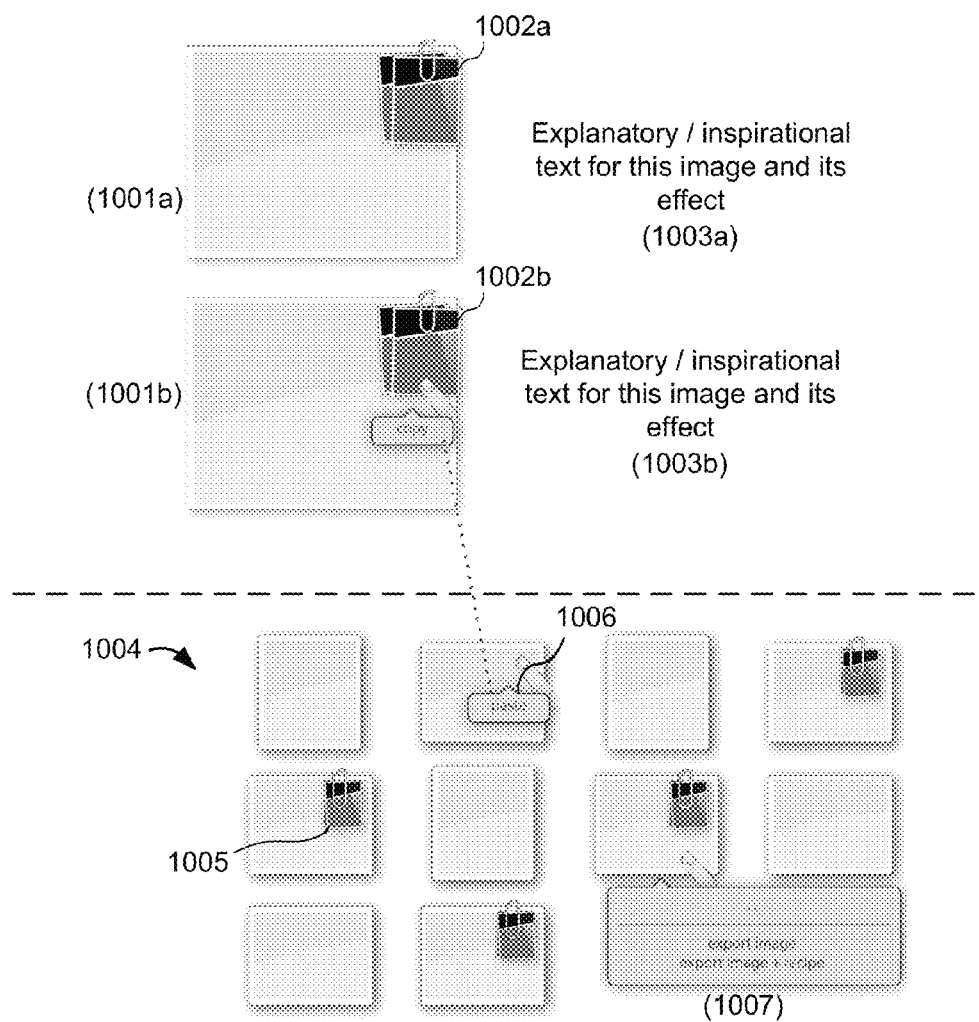
FIG. 10 illustrates example images shared with recipes, according to some implementations.

FIG. 10 illustrates example images shared with recipes, according to some implementations. Various implementations enable the user to elegantly and efficiently share recipes with other users. As shown, images 1001a and 1001b can be displayed in any location such as on a website, or a "recipe gallery," or a "lesson room" or any other kind of inspiring sample art section within an image editing software or associated with image editing software. The images 1001a and 1001b may have associated edit stacks 1002a and 1002b connected with images 1001a and 1001b.

Additionally, explanatory or inspirational text 1003a and 1003b may be added to the images 1001a and 1001b. Also, the user's own image repository/collection 1004 can be displayed. Images with a stack of edits already applied 1005 can be displayed. The user can either drag-and-drop or copy-and-paste 1006 effects from the sample library 1001-1003 to the user's own images 1004. The user can also choose to export images with or without a recipe, thereby ensuring that a recipe is shared alongside a representative sample picture. It is also possible to share some images with an edit list 1002a, while another may be only sample library image 1001, possibly with text 1003a and 1003b, where the text and image alone inspire the user to use a certain camera setting or photographic method. This way, it is possible to have a library of good reference images, image editing stacks and photographic lessons and tips and tricks without the need of having different formats or categories to behold all of said types of inspirational material.

In various implementations, the system enables the user to also list sample images, or sample lessons including images, with a connected stack of edits which the user can use as an inspirational library. The user can use the edit stacks and apply them to his or her own images. Also, images can be used with other, smaller and/or more user friendly applications that provide even easier edits. In some implementations, these smaller applications can then export an image file that can feature—when opened with an application featuring the full implementation of this application—a stack of applied edits. For example, a small application for a mobile phone that shoots amazing, dramatic looking black and white long-exposures at the push of a button. When the resulting images are imported into a larger image editing system, the user would see that a stack containing: <long exposure photo>, <local contrast>, <black and white> that can be connected to the image, and the user may then choose to either apply the effect to other images, or to modify this image, for example by removing the black and white effect to have the same image in color.

Some of the following implementations are related to edit branching. In some implementations, images within the editing system can be duplicated, the copy then having an identical stack, so that the user can further modify said second version of the first image. This may be helpful if, for instance, a user wants to turn one favorite image into one good looking black and white final image and another good looking final color image.

Figure 11:
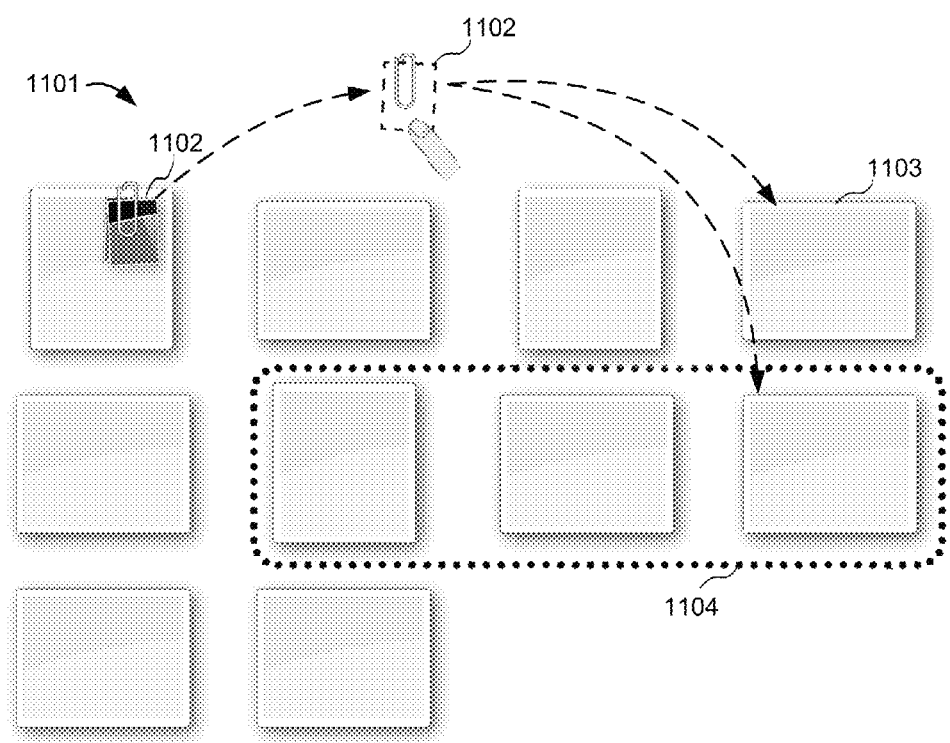
FIG. 11 illustrates an example edit stack being applied to another image or to a selection of images, according to some implementations.

FIG. 11 illustrates an example edit stack being applied to another image or to a selection of images, according to some implementations. A user's image collection 1101 is displayed for editing. The user can drag-and-drop an edit stack 1102 on to a single image 1103 or a set/group of images 1104. The edit stack is then applied to the one or more images 1103 and 1104.

Figure 12:
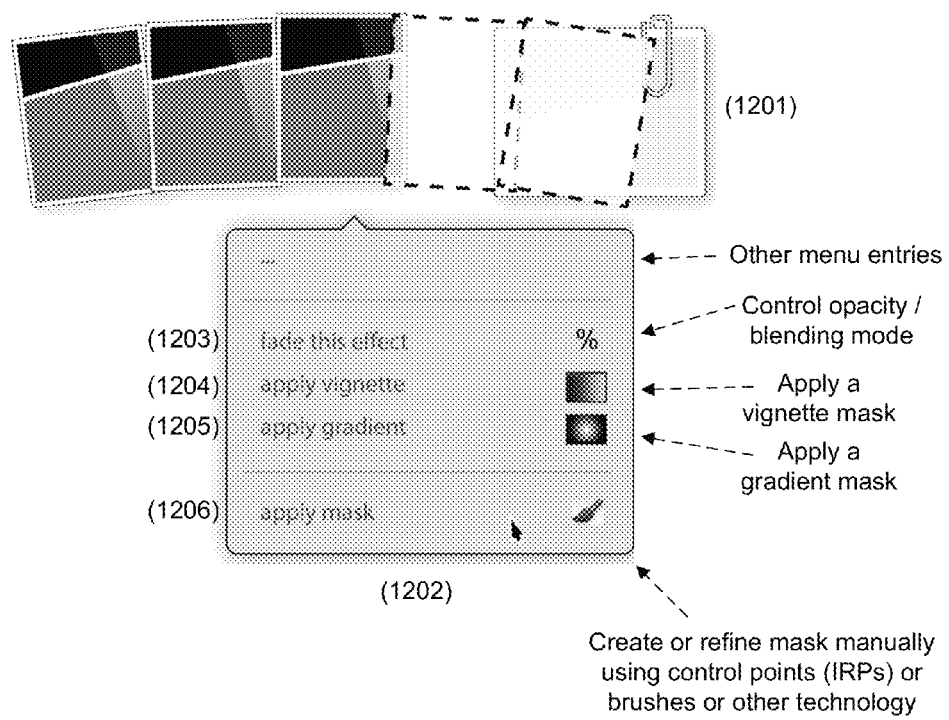
FIG. 12 illustrates an example edit stack for applying fade/masking/blending operations on an image, according to some implementations.

FIG. 12 illustrates an example edit stack for applying fade/masking/blending operations on an image, according to some implementations. A popular feature among users is controlling opacity or blending. An image with an expanded edit stack 1201 is displayed, where the user has "gone to" the effect number 3 (e.g., third edit from the left), meaning he has "gone back" by two edits. The user can open and display a menu 1202, which relates to the active effect (e.g., effect number 3).

As shown, in some implementations, a "fade this effect" menu entry 1203 may also be displayed. If the user clicks the fade menu entry 1203, instructions for an interface would be accessible, providing the user with options to control the opacity and the blending mode of the selected effect (such as 75% opacity in "overlay" mode).

In some implementations, an "apply vignette" option 1204 can be displayed. This option, when selected, instructs the processor to display an interface where the user can choose to apply the selected effect with a gradient mask, such as "90 degree, 100% effect on top, 0% effect on bottom." In some implementations, an "apply gradient" option 1205, can be displayed. This option 1205 can instruct the processor to display an interface within where the user can choose to apply the selected effect with a circular mask, such as "geometric image center, 100% effect in center, 0% effect on perimeter."

In some implementations, a menu entry "apply mask" 1206 can be displayed providing instructions so that the user can use brushes, IRPs, smart selection tools or other tools known to those with skill in the art to either create a mask from scratch, or to refine an existing mask, such as a gradient or vignette mask.

Figure 13:
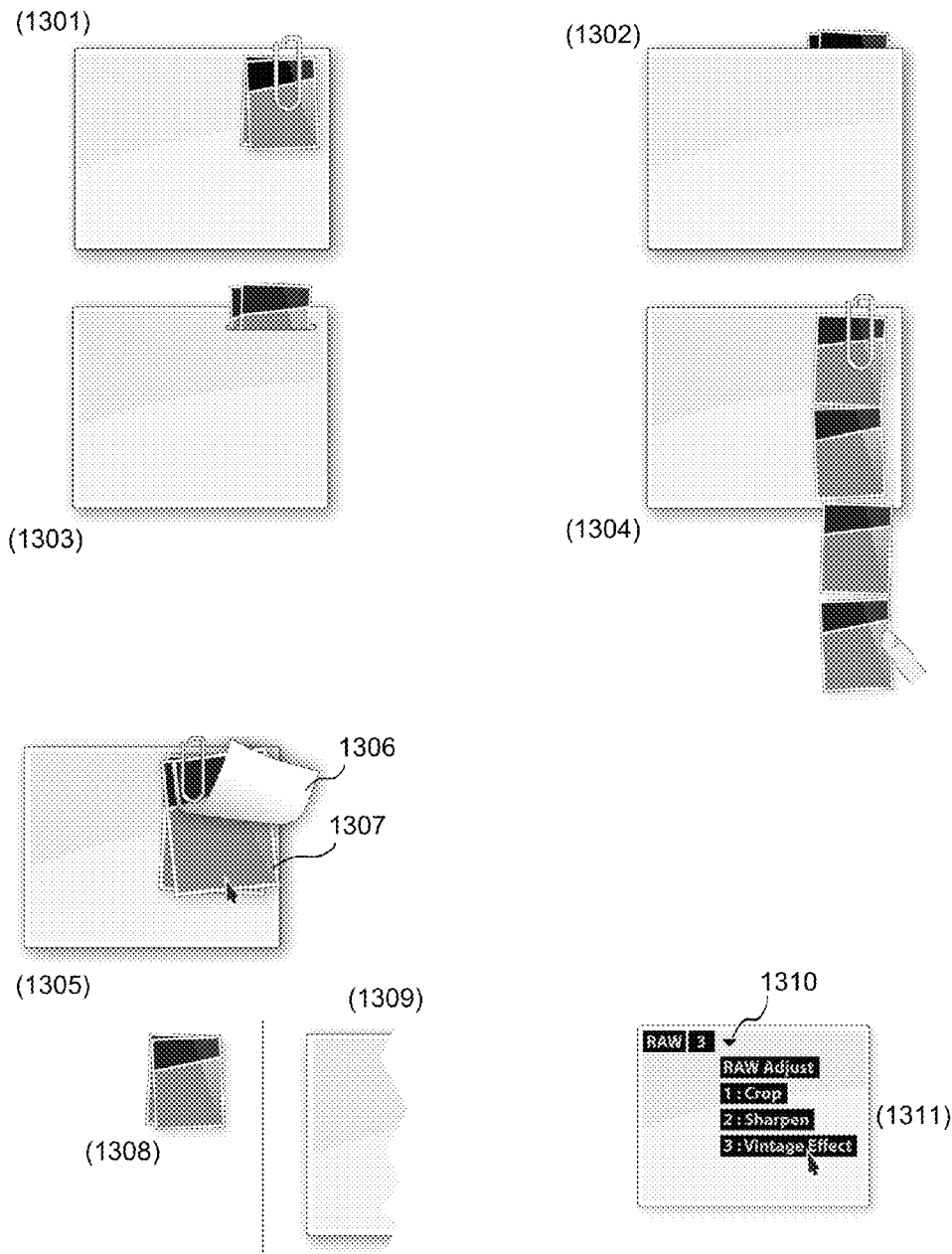
FIG. 13 illustrates an example edit stack and an image position, according to some implementations.

FIG. 13 illustrates an example edit stack and an image position, according to some implementations. As shown, in some implementations, an edit stack 1301 may be connected to an image using a paper clip symbol. It is noted that the paper clip symbol is one example for illustrating the concept. Such a symbol may not be necessary in some implementations designed for everyday use. Simple superposition of an edit stack may suffice. As will be understood by those with skill in the art with reference to this disclosure, other symbols can be used. For example, the "connected image can be selected from the group consisting of: a sleeve, an envelope, a simple graphical symbol that is suitable to contain a stack of edits, a paper clip, a pin (graphically displayed to pin the edits to the image), a simple header, a stack of effect icons, a basket full of effect icons, a clothespin icon, a push pin, a thumb tack, a (white board) magnet, photo corners and a simple staple. The previous list is used to illustrate other symbols, it is not meant to be used in a limiting sense. Other even more simple objects as a tag graphically holding the edits together can be used.

In some implementations, there is shown a "partially hidden" edit stack 1302 behind the image, thereby indicating the existence of an edit stack (a rollover or a tap could bring it to the front) while not covering the image area. An edit stack can be graphically inserted into a slot within the image 1303. A downward expanded edit stack can be displayed 1304.

Also, a graphical representation 1305 may be displayed so the user can edit an effect within the sequence of applied edits (for example: number three out of a total of five edits), while also indicating graphically to the user that additional subsequent effects are available for re-application. Subsequent effect(s) 1306, current active effect(s) (e.g., selected for modification) 1307 can also be displayed to the user. An edit stack positioned in the vicinity of the image 1308 or superimposed 1309 on the image can be displayed. A similar, but more screen real estate saving graphical representation can combine all of the above. A simple number ("3") indicates the number of steps, while "RAW" may indicate that the image may have been shot with a camera hardware capable of Raw shooting (e.g., capable of shooting a digital negative). A triangle 1310 in the display may be used to trigger the display of the edit list contents 1311.

The edit stacks described in this disclosure emphasize displaying a symbol representing the entire edits/edit stack to the user (possibly alongside a list of edits) over showing a list of edits, so that user-friendly, convenient operations on the edit stack as a whole can be performed by the user. In various implementations, if multiple images are shown, for each image having edits, a stack can be displayed so that multiple image/multiple edit stacks management can be displayed. Preferably, the edit stacks being displayed are associated with, superimposed with, or in the vicinity of the image that the edits are applied to. Additionally, the system provides capabilities so that individual edits of the edit stack can be displayed by performing a user action on the edit stack or its graphical representation. Also, a majority of image operations are implemented with a graphical representation that is suitable to be part of a stack, for example, similar icon sizes facilitate the creation of an application using implementations described herein. In other words, the application is laid out so that all or most edits can be stacked or listed graphically, and the icon element within the stack looks similar to the icon of the edit within the application. Another characteristic of edit stacks is that meta-operations are performed on the stack or on the edits, being the elements of the stack.

Figure 14:
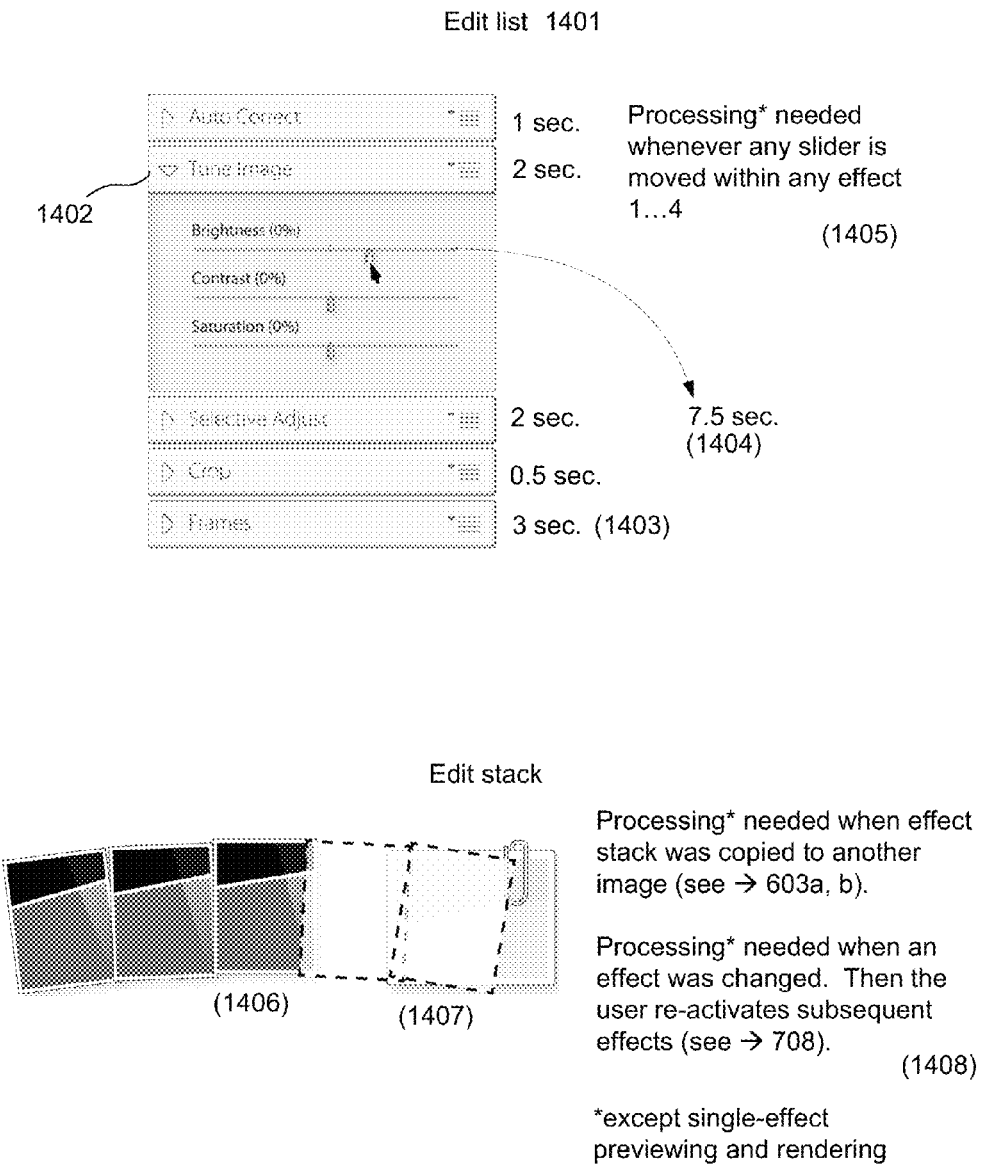
FIG. 14 illustrates an example reduction of processing required to edit an image, according to some implementations.

FIG. 14 illustrates an example reduction of processing required to edit an image, according to some implementations. A conventional edit list 1401 (known from many image editing applications) is compared to implementations described herein displaying effect number two 1402, out of a total of five effects, being expanded, so that sliders and controls for editing are accessible to the user. Each of the effects requires a certain amount of time to be processed 1403. A single parameter change within the edit sequence may require an accumulated amount of time 1404 for the result to be displayed.

Unlike a list, the edit stack 1406 and 1407 may be displayed showing that the user has currently selected effect number three out of a total of five, thereby deactivating subsequent effects. Also, in the case of an edit list, reprocessing 1405 may be necessary on a regular basis, in the case of an edit stack, reprocessing 1408 of a series of edits may not be needed on a regular basis. In particular, lengthy reprocessing may never be needed at a time when the user isn't expecting it. For example, when pasting an effect stack to another image, it is foreseeable by the user that processing will need to take place, while when moving a single slider, lengthy processing may not be welcomed/accepted by the user.

Figure 15:
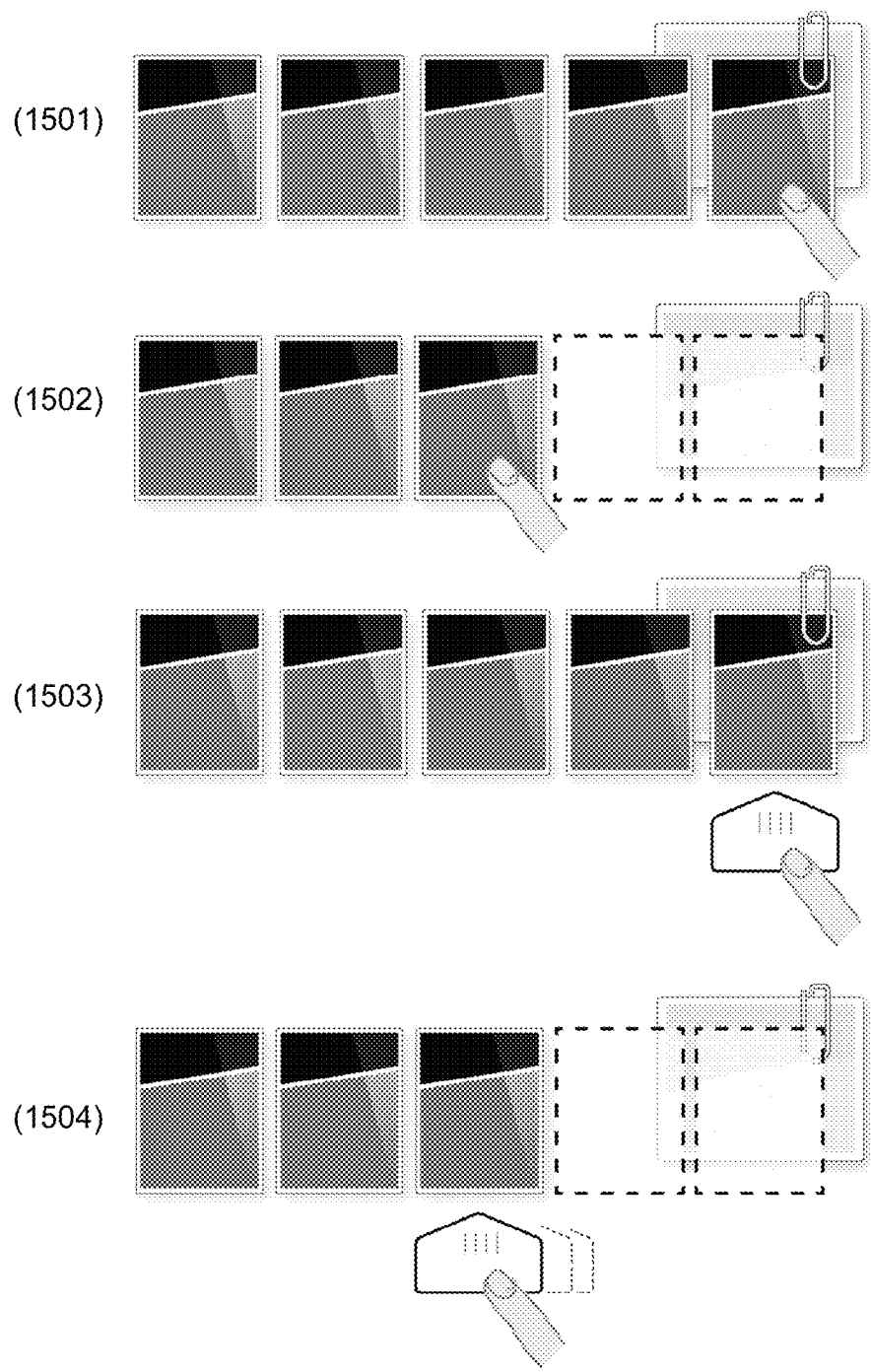
FIG. 15 illustrates an example slider that can interact with a stack, according to some implementations.

FIG. 15 illustrates an example slider that can interact with a stack, according to some implementations. As shown, instead of tapping (clicking) to open the edit stack 1501 and then selecting an edit 1502, the software can include instructions to alternatively display a slider or pointer 1503 when the edit stack is expanded. This facilitates displaying to the user that reverting the edits temporarily 1504 is possible. Also, it makes it easier to understand that activating an edit (e.g., enabling edit number three out of the five edits to be modified) is equivalent with deactivating the subsequent steps, and also being equivalent with selecting an effect (number 3) for actions, such as deleting, resetting, re-editing, changing opacity and so forth as illustrated before. While this may look obvious in drawings 1502 and 1504, it is substantially different to all image editing systems currently used.

Figure 16:
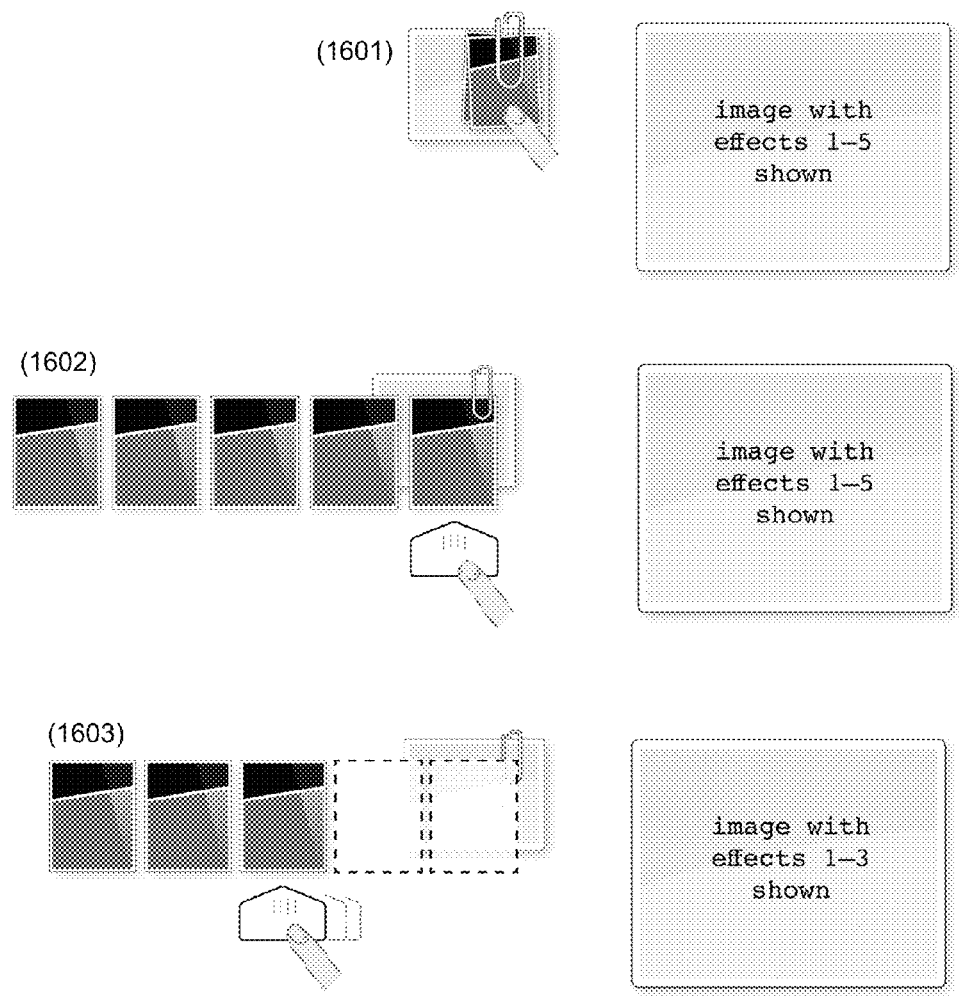
FIG. 16 illustrates the example slider of FIG. 15 in operation, according to some implementations.

FIG. 16 illustrates the example slider of FIG. 15 in operation, according to some implementations. As shown, the main image preview is shown, as is its behavior when navigating through the edit list. A collapsed edit stack in example 1601 is shown with five effects and a larger image preview where all five effects are applied and shown to the user.

A similar behavior is shown when the edit stack is expanded subsequent to a tap/click on the edit stack in example 1602 by the user. If the user reverts the image back to the third edit in example 1603, the main image preview only displays the image with effects 1-3 applied.

Figure 17:
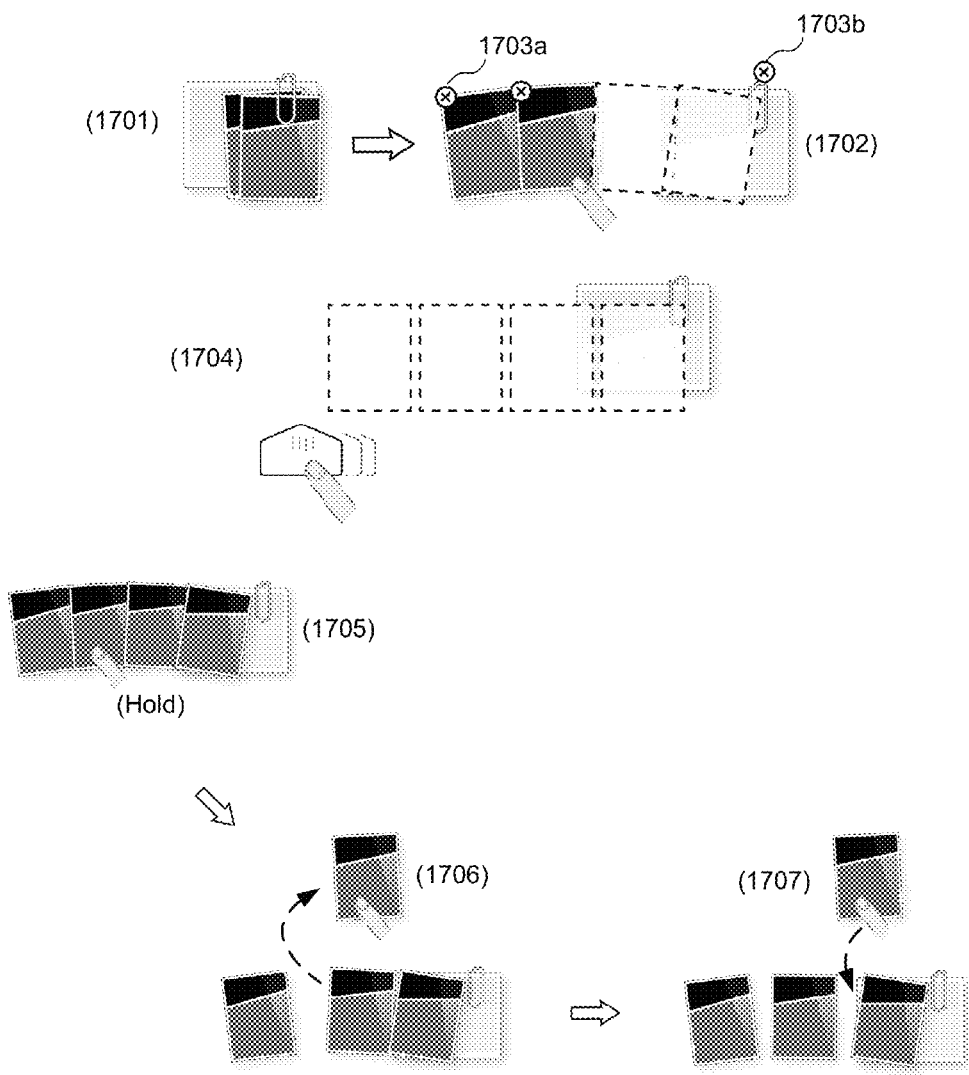
FIG. 17 illustrates examples of advanced editing options for the edit stacks, according to some implementations.

FIG. 17 illustrates examples of advanced editing options for the edit stacks, according to some implementations. An edit stack in example 1701 can be opened 1702 and an optional means for deleting a single editing step, in lieu of a contextual menu or a 'delete' button, can be displayed 1703a and 1703b. A delete button relating to one single editing step 1703a can be displayed or a delete button relating to all edits of the image 1703b can be displayed.

Additionally, all edits applied to an image can be undone by allowing the user to access the status before the first edit (by an index finger tapping to the left of the first edit, or by dragging the slider to a position understood as the location 'before' the first edit) 1704, thereby reverting the image to its virgin state.

Also, in some implementations, edit steps may be rearranged 1705. For example, the second edit is selected by the user using a long click or a long index finger tap. Then, the user can move the edit 1706 out of the series of edits and enter it back into the editing chain at a new position 1707, thereby exchanging edits 2 and 3 with one another.

In some implementations, the system can include instructions for editing an image and displaying all the edits as graphical representations. Note that conventional image applications do not support these criteria, as many image edits (such as "invert") are only menu entries and hence have not their own graphical representations.

In the same implementations, meta-operations on edits are not represented through graphical forms, as they will be handled via the stack introduced in this application.

In various implementations, the term "meta-operation (of an effect)" refers to effect operations on an image effect. For example: deleting an effect is a meta-operation, while turning an image white would be an effect. Other meta-operations can include adding a mask to an effect, fading an effect, copying and pasting an effect, changing the order of effects, and so forth.

In some implementations, meta-operations may include: apply (drag, copy-and-paste) one edit to another image; apply (drag, copy-and-paste) all edits to another image; delete an edit; change the opacity of an edit; change the blending mode of an edit; assign a mask to an edit; etc.

Also, the user can have a collection of images where, for each image that has received edits, an edit stack is shown. Note that the edit stacks need not be displayed permanently; a "display edit stacks" checkbox may allow a user to turn the visibility on or off.

Within this collection of images, stacks can be dragged or copied from one image to another, which is a user-friendly implementation of batching. Some implementations can also feature software cameras, if a camera is connected (directly or via data protocol) to any hardware or software that can create images, and allow the user to apply further edits.

What has been described is a new and improved system for a compartmentalized image editing system that is simple to operate and operable with a single hand, overcoming the limitations and disadvantages inherent in the related art.

Although implementations have been described with a degree of particularity, it is understood that the present disclosure has been made by way of example. As various changes could be made in the above description without departing from the scope of the invention, it is intended that all matter contained in the above description or shown in the accompanying drawings shall be illustrative and not used in a limiting sense.

Implementations described herein provide various benefits. For example, implementations enable a user to edit images with a single hand, which is optimal for many devices that are held in one hand and operated with another hand. With the advances of tablet and smart phone computing and advances in camera technology for those devices, implementations provide users with a simple and powerful edit management system for such computing devices. Furthermore, implementations enable a user to apply a stack of edits to a series of images allowing batch processing without extensive training. Furthermore, implementations provide more efficient interactions between a user and devices that have reduced screen space.

Figure 18:
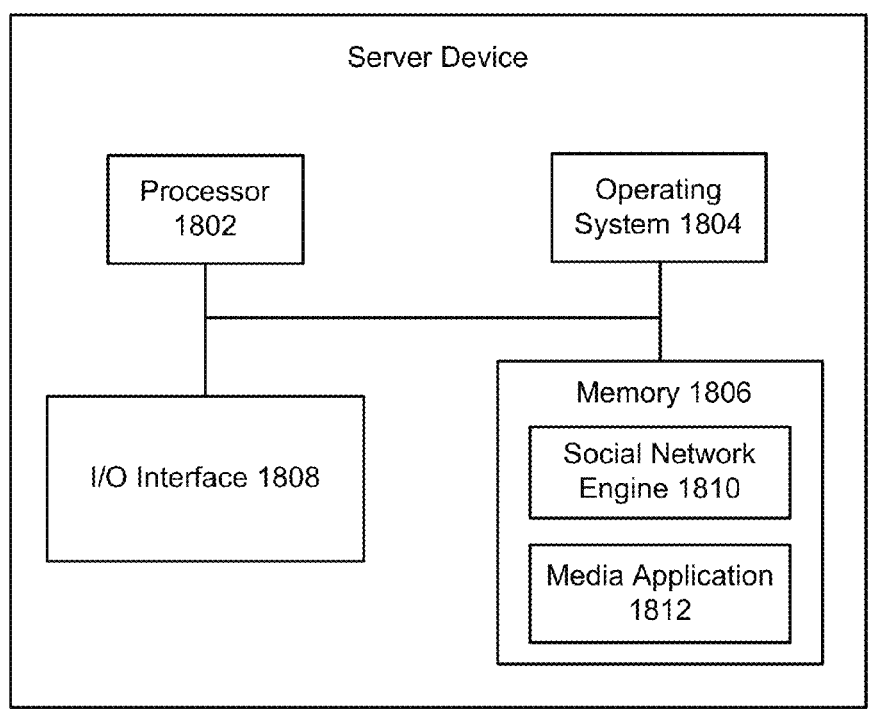
FIG. 18 illustrates a block diagram of an example server device, which may be used to implement the implementations described herein.

FIG. 18 illustrates a block diagram of an example server device 1800, which may be used to implement the implementations described herein. For example, server device 1800 may be used to implement server device that perform the implementations described herein. In some implementations, server device 1800 includes a processor 1802, an operating system 1804, a memory 1806, and an input/output (I/O) interface 1808. Server device 1800 also includes a social network engine 1810 and a media application 1812, which may be stored in memory 1806 or on any other suitable storage location or computer-readable medium. Media application 1812 provides instructions that enable processor 1802 to perform the functions described herein and other functions.

For ease of illustration, FIG. 18 shows one block for each of processor 1802, operating system 1804, memory 1806, I/O interface 1808, social network engine 1810, and media application 1812. These blocks 1802, 1804, 1806, 1808, 1810, and 1812 may represent multiple processors, operating systems, memories, I/O interfaces, social network engines, and media applications. In other implementations, server device 1800 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, flash memory devices, or other tangible media suitable for storing instructions for execution by the processor. The term "machine readable medium" includes, but is not limited to portable or fixed storage devices, optical storage devices, wireless channels and various other mediums capable of storing, containing or carrying instruction(s) and/or data.

The drawings and the associated descriptions are provided to illustrate implementations. Reference in the specification to one or more implementations is intended to indicate particular features, structures, and/or characteristics described in connection with the one or more implementations. The appearances of the term "implementation" in various places in the specification are not necessarily all referring to the same implementation.

Throughout the drawings, reference numbers are re-used to indicate correspondence between referenced elements. In addition, the first digit of each reference number may indicate the figure where the element first appears.

As used in this disclosure, except where the context indicates otherwise, the term "comprise" and variations of the term, such as "comprising," "comprises," and "comprised" are not intended to exclude other additives, components, integers, and/or steps.

In the description of various implementations, specific details are given to provide a thorough understanding of the implementations. However, it will be understood by one of ordinary skill in the art that the implementations may be practiced without these specific detail. Well-known circuits, structures and techniques may not be shown in detail in order not to obscure the implementations. For example, circuits may be shown in block diagrams in order not to obscure the implementations in unnecessary detail.

Also, it is noted that the implementations may be described as a process that is depicted as a flowchart, a flow diagram, a structure diagram, or a block diagram. Although a flowchart may describe the operations as a sequential process, many of the operations may be performed in parallel or concurrently. In addition, the order of the operations may be rearranged. A process may be terminated when its operations are completed. A process may correspond to a method, a function, a procedure, a subroutine, a subprogram, etc. When a process corresponds to a function, its termination may correspond to a return of the function to the calling function or the main function.

Furthermore, implementations may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more processors may perform the necessary tasks in series, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

What is claimed is:

1. A method comprising:
   providing a selection of image enhancements to a user by causing the image enhancements to be displayed as a collection of icons, wherein the icons represent different image enhancements that are applied to one or more images, wherein the collection is positioned in a predetermined location relative to one or more image thumbnails to indicate that the image enhancements are applied to the one or more images associated with the one or more image thumbnails, and wherein the icons are displayed in a sorted order such that the corresponding image enhancements are applied to each of the one or more images in the sorted order;
   enabling the user to select any icon in the collection to modify the collection, wherein a selected icon has a corresponding selected image enhancement;
   receiving input from the user, the input indicative of selection of a particular icon in the collection and further indicative of a modification of the image enhancement that corresponds to the particular icon;
   hiding one or more icons associated with one or more image enhancements that are one or more subsequent image enhancements relative to the image enhancement that corresponds to the particular icon; and
   deactivating the one or more subsequent image enhancements corresponding to the one or more hidden icons.

2. The method of claim 1, wherein the one or more hidden icons are displayed in the collection to indicate a state of inactiveness.

3. The method of claim 1, further comprising enabling the user to reactivate one or more deactivated image enhancements.

4. The method of claim 1, further comprising enabling the user to transfer the collection from one image thumbnail to one or more other image thumbnails to apply the image enhancements associated with the collection to images corresponding to the one or more other image thumbnails.

5. A method comprising:
   providing a selection of image enhancements to a user by causing the image enhancements to be displayed as a collection of icons, wherein the icons represent different image enhancements that are applied to one or more images;
   enabling the user to select any icon in the collection to modify the collection, wherein a selected icon has a corresponding selected image enhancement;
   receiving input from the user, the input indicative of selection of a particular icon in the collection and further indicative of a modification of the image enhancement that corresponds to the particular icon;
   hiding one or more icons associated with one or more image enhancements that are one or more subsequent image enhancements relative to the image enhancement that corresponds to the particular icon; and
   deactivating the one or more subsequent image enhancements corresponding to the one or more hidden icons.

6. The method of claim 5, wherein the collection of icons is displayed as a stack of icons that includes one or more active icons and the one or more hidden icons are displayed to indicate a state of inactiveness.

7. The method of claim 5, wherein the collection of icons are illustrated horizontally and the image enhancement associated with a left-most icon is applied first.

8. The method of claim 5, further comprising enabling the user to modify the selected image enhancement.

9. The method of claim 5, further comprising enabling the user to reactivate one or more deactivated image enhancements.

10. The method of claim 5, further comprising enabling the user to transfer the collection from one image thumbnail to one or more other image thumbnails to apply the image enhancements associated with the collection to one or more images corresponding to the one or more other image thumbnails.

11. The method of claim 5, further comprising enabling the user to transfer the collection from one image thumbnail to one or more other image thumbnails to apply the image enhancements associated with the collection to one or more images corresponding to the one or more other image thumbnails, and wherein a transferring of the collection is based on one of a drag-and-drop operation or a copy-and-paste operation.

12. The method of claim 5, wherein the collection comprises a thumbnail of at least one image.

13. The method of claim 5, wherein the collection comprises an icon representing a software camera module.

14. The method of claim 5, wherein the collection comprises an icon representing an output module.

15. A system comprising:
one or more processors; and
logic encoded in one or more tangible media for execution by the one or more processors and when executed operable to perform operations comprising:
providing a selection of image enhancements to a user by causing the image enhancements to be displayed as a collection of icons, wherein the icons represent different image enhancements that are applied to one or more images;
enabling the user to select any icon in the collection to modify the collection, wherein a selected icon has a corresponding selected image enhancement;
receiving input from the user, the input indicative of selection of a particular icon in the collection and further indicative of a modification of the image enhancement that corresponds to the particular icon;
hiding one or more icons associated with one or more image enhancements that are one or more subsequent image enhancements relative to the image enhancement that corresponds to the particular icon; and
deactivating the one or more subsequent image enhancements corresponding to the one or more hidden icons.

16. The system of claim 15, wherein the collection is positioned in a predetermined location relative to one or more image thumbnails to indicate that the image enhancements are applied to one or more images associated with the one or more image thumbnails.

17. The system of claim 15, wherein the icons are displayed in a sorted order such that the corresponding image enhancements are applied to each of the one or more images in the sorted order.

18. The system of claim 15, wherein the logic when executed is further operable to perform operations comprising enabling the user to modify the selected image enhancement.

19. The system of claim 15, wherein the logic when executed is further operable to perform operations comprising enabling the user to reactivate one or more deactivated image enhancements.

20. The system of claim 15, wherein the logic when executed is further operable to perform operations comprising enabling the user to transfer the collection from one image thumbnail to one or more other image thumbnails to apply the image enhancements associated with the collection to images corresponding to the one or more other image thumbnails.

* * * * *